(12) United States Patent
Pang et al.

(10) Patent No.: US 10,439,734 B2
(45) Date of Patent: Oct. 8, 2019

(54) METHOD AND SYSTEM FOR WAVEGUIDE DELAY BASED EQUALIZATION WITH SUMMING AT SINGLE-ENDED TO DIFFERENTIAL CONVERTERS IN OPTICAL COMMUNICATION

(71) Applicant: Luxtera, Inc., Carlsbad, CA (US)

(72) Inventors: Simon Pang, San Diego, CA (US); Joseph Balardeta, Encinitas, CA (US)

(73) Assignee: Luxtera, Inc., Carlbad, CA (US)

( * ) Notice: Subject to any disclaimer, the term of this patent is extended or adjusted under 35 U.S.C. 154(b) by 14 days.

(21) Appl. No.: 15/636,540

(22) Filed: Jun. 28, 2017

(65) Prior Publication Data

US 2018/0006732 A1 Jan. 4, 2018

Related U.S. Application Data

(60) Provisional application No. 62/357,769, filed on Jul. 1, 2016.

(51) Int. Cl.
*H04B 10/69* (2013.01)
*H04B 10/25* (2013.01)

(52) U.S. Cl.
CPC ..... *H04B 10/6931* (2013.01); *H04B 10/2504* (2013.01); *H04B 10/691* (2013.01)

(58) Field of Classification Search
CPC .............. H04B 10/2504; H04B 10/691; H04B 10/6931
USPC .................................................. 398/202–214
See application file for complete search history.

(56) References Cited

U.S. PATENT DOCUMENTS

| | | | | |
|---|---|---|---|---|
| 7,450,863 | B2 * | 11/2008 | Winzer | H04B 10/677 398/202 |
| 8,625,935 | B2 * | 1/2014 | Mekis | G02F 1/313 385/3 |
| 8,831,441 | B2 * | 9/2014 | Sasaki | H04B 10/548 398/202 |
| 9,515,736 | B2 * | 12/2016 | Hemenway, Jr. | H04B 10/2581 |
| 9,768,747 | B2 * | 9/2017 | Barabas | H03F 1/086 |
| 9,813,152 | B2 * | 11/2017 | Pinguet | G02B 6/1228 |
| 9,941,957 | B2 * | 4/2018 | Sahni | H04B 10/40 |
| 9,973,282 | B2 * | 5/2018 | Welch | H03F 3/085 |
| 10,128,957 | B2 * | 11/2018 | Welch | H04B 10/516 |

(Continued)

*Primary Examiner* — Amritbir K Sandhu
(74) *Attorney, Agent, or Firm* — McAndrews, Held & Malloy

(57) ABSTRACT

Methods and systems for waveguide delay based equalization summing at single-ended to differential converters in optical communication are disclosed and may include: in an optoelectronic receiver including a directional coupler, photodetectors, transimpedance amplifiers (TIAs), and a gain stage, receiving an input optical signal; splitting the input optical signal into first and second optical signals using the directional coupler; generating a first current from the first optical signal using a first photodetector; generating a first voltage from the first current using a first TIA; communicating the first voltage to a first input of the gain stage; generating a second current from the second optical signal using a second photodetector; generating a second voltage from the first signal using a second TIA; communicating the second voltage to a second input of the gain stage; and generating a differential output voltage from the first and second voltages using the gain stage.

20 Claims, 7 Drawing Sheets

(56) References Cited

U.S. PATENT DOCUMENTS

| | | | |
|---|---|---|---|
| 10,243,672 B2* | 3/2019 | Pang | H04B 10/66 |
| 10,243,674 B2* | 3/2019 | Welch | H03F 3/085 |
| 2007/0115051 A1* | 5/2007 | Sutardja | H03F 1/08 |
| | | | 330/100 |
| 2008/0199190 A1* | 8/2008 | Hakomori | H04B 10/69 |
| | | | 398/202 |
| 2009/0087197 A1* | 4/2009 | Welch | H04L 25/0272 |
| | | | 398/209 |
| 2009/0226187 A1* | 9/2009 | Tanimura | H04B 10/60 |
| | | | 398/202 |
| 2010/0284703 A1* | 11/2010 | Suzuki | H01L 31/02019 |
| | | | 398/212 |
| 2012/0001166 A1* | 1/2012 | Doany | G02B 6/4246 |
| | | | 257/43 |
| 2013/0028596 A1* | 1/2013 | Suzuki | H04B 10/6931 |
| | | | 398/25 |
| 2014/0255042 A1* | 9/2014 | Kaikkonen | H04B 10/40 |
| | | | 398/136 |
| 2016/0211807 A1* | 7/2016 | Barabas | H03F 1/086 |
| 2017/0131142 A1* | 5/2017 | Luk | H04B 10/6931 |
| 2018/0006731 A1* | 1/2018 | Pang | H04B 10/66 |
| 2018/0006732 A1* | 1/2018 | Pang | H04B 10/6931 |
| 2019/0052370 A1* | 2/2019 | Pang | H04B 10/6971 |

\* cited by examiner

METHOD AND SYSTEM FOR WAVEGUIDE DELAY BASED EQUALIZATION WITH SUMMING AT SINGLE-ENDED TO DIFFERENTIAL CONVERTERS IN OPTICAL COMMUNICATION

CROSS-REFERENCE TO RELATED APPLICATIONS/INCORPORATION BY REFERENCE

This application claims priority to and the benefit of U.S. Provisional Application 62/357,769 filed on Jul. 1, 2016, which is hereby incorporated herein by reference in its entirety.

FIELD

Certain embodiments of the disclosure relate to semiconductor photonics. More specifically, certain embodiments of the disclosure relate to a method and system for waveguide delay based equalization with summing at single-ended to differential converters in optical communication.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for waveguide delay based equalization with summing at single-ended to differential converters in optical communication, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
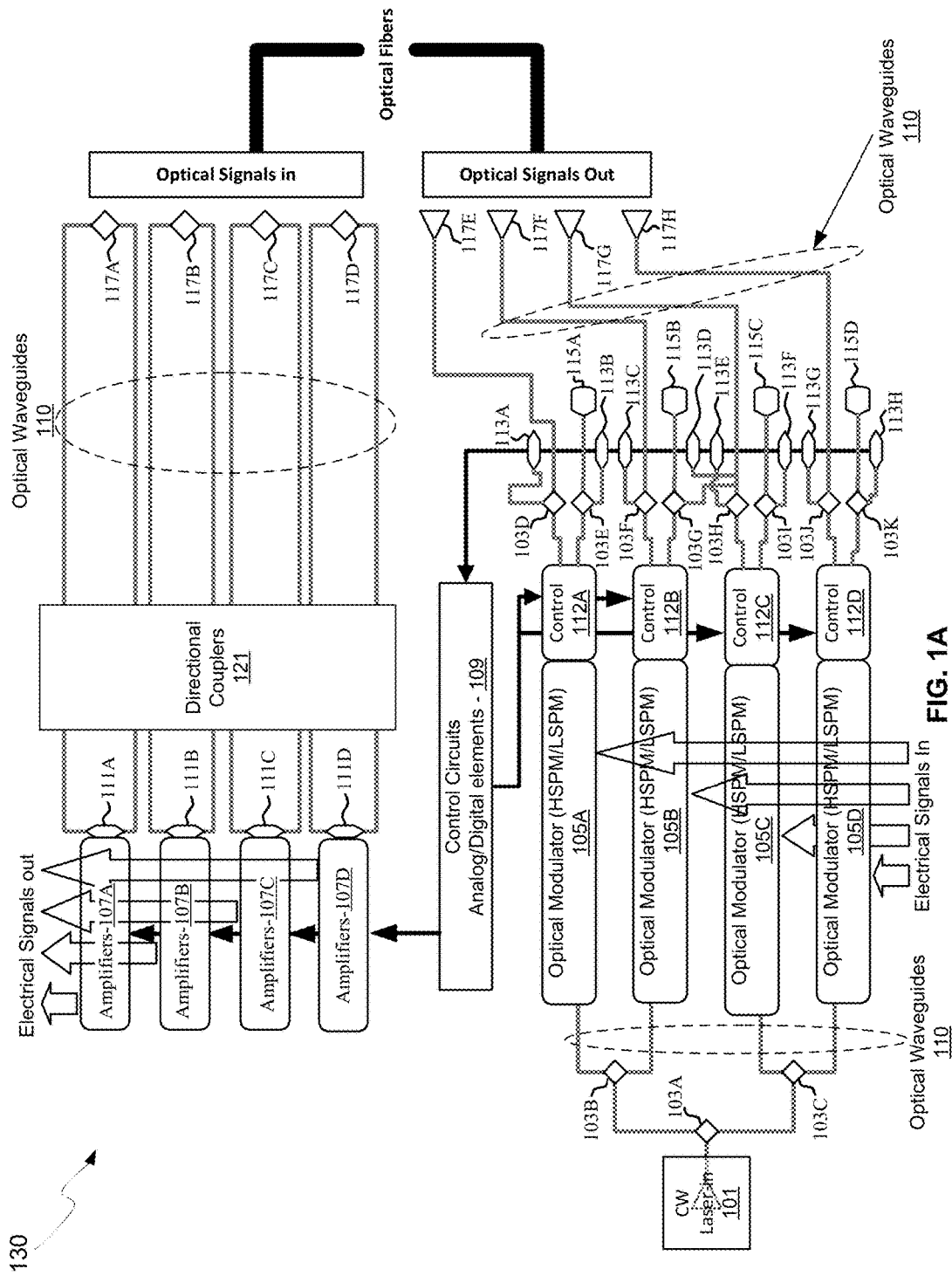
FIG. 1A is a block diagram of a photonically-enabled integrated circuit with waveguide delay based equalization with summing at single-ended to differential converters, in accordance with an example embodiment of the disclosure.

FIG. 1A is a block diagram of a photonically-enabled integrated circuit with waveguide delay based equalization with summing at single-ended to differential converters, in accordance with an example embodiment of the disclosure. Referring to FIG. 1A, there is shown optoelectronic devices on a photonically-enabled integrated circuit 130 comprising optical modulators 105A-105D, photodetectors 111A-111D, monitor photodetectors 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more CW optical signals to the coupler 103A. The photonically enabled integrated circuit 130 may comprise a single chip, or may be integrated on a plurality of die, such as one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

In another example scenario, the Y-junction may be utilized in a parallel multi-channel transmitter, where a cascade of 1-by-2 splitters can be employed to have a single light source feed multiple channels. Interleaver-based multiplexers and demultiplexers constitute a third example where 1-by-2 splitters are among the building blocks.

In an example embodiment, the photodetectors 111A-111D and monitor photodetectors 113A-113H may comprise photodiodes, such as PN or PIN junctions, although other detector types may be utilized, such as photoconductors, MSM photodetectors, or avalanche photodiodes, for example.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is optimized.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodetectors 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
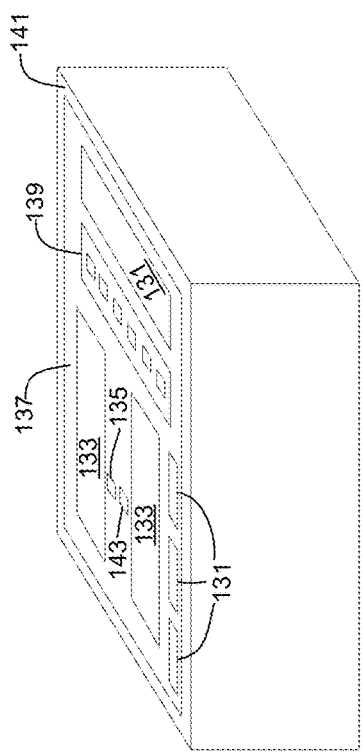
FIG. 1B is a diagram illustrating an exemplary photonically-enabled integrated circuit, in accordance with an example embodiment of the disclosure.
Figure 1B:
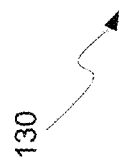

In another example embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The directional couplers 121 may receive optical signal in one or more inputs and couple output optical signals to one or more outputs. In this manner, a single optical signal may be split between two output waveguides 110, for example. The photodetectors 111A-111D may convert optical signals received from the grating couplers 117A-117D, via the directional couplers 121, into electrical signals that are communicated to the amplifiers 107A-107D for processing.

In the receiver subsystem implemented in a silicon chip, light is often coupled into a photodetector via a polarization-splitting grating coupler that supports coupling all polarization states of the fiber mode efficiently. The incoming signal is split by the PSGC into two separate waveguides in a polarization-diversity scheme, and therefore both inputs to the waveguide photodetectors are used. If two different PSGCs are required to couple into the same photodetector, then the PD has have four separate waveguide ports.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths, and equalizing signals for reducing and/or eliminating inter-symbol interference (ISI), which may be a common impairment in optical communication systems.

ISI may be introduced by a channel and/or the transmitter/receiver of the optical system, and can limit the maximum speed of the communication system. An equalizer may be utilized to mitigate ISI, and may comprise waveguide delay-based equalization. Equalizers may utilize delay elements and weight elements applied to each delayed signal, which may then be summed for an equalized signal with mitigated ISI. In an example scenario, this delay may be accomplished with optical delay and weight control may be enabled through electrical and/or optical means. In an example scenario, the weighting may be implemented optically and the summing may be electrically following transimpedance amplifiers, such that the resulting voltages are amplified to generate an output voltage.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodetector 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodetectors 111A-111D, and monitor photodetectors 113A-113I.

Figure 1C:
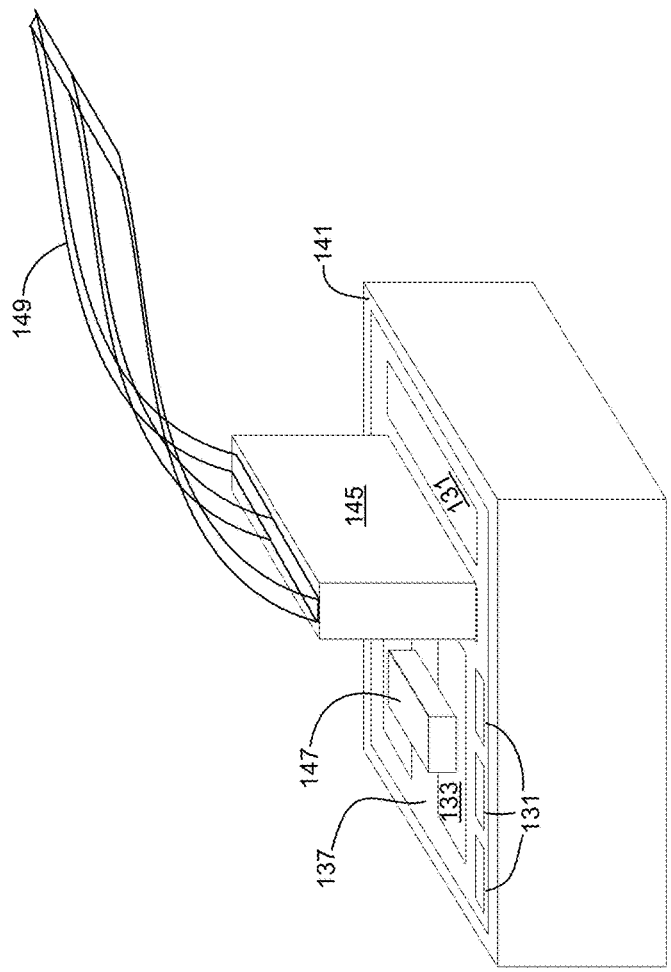
FIG. 1C is a diagram illustrating a photonically-enabled integrated circuit coupled to an optical fiber cable, in accordance with an example embodiment of the disclosure.
Figure 1C:
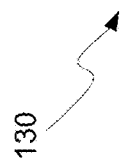

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130. In another example scenario, the IC 130 may comprise photonic devices on one die, such as a photonics interposer, and electrical devices on an electronics die, both of which may comprise CMOS die.

Figure 2:
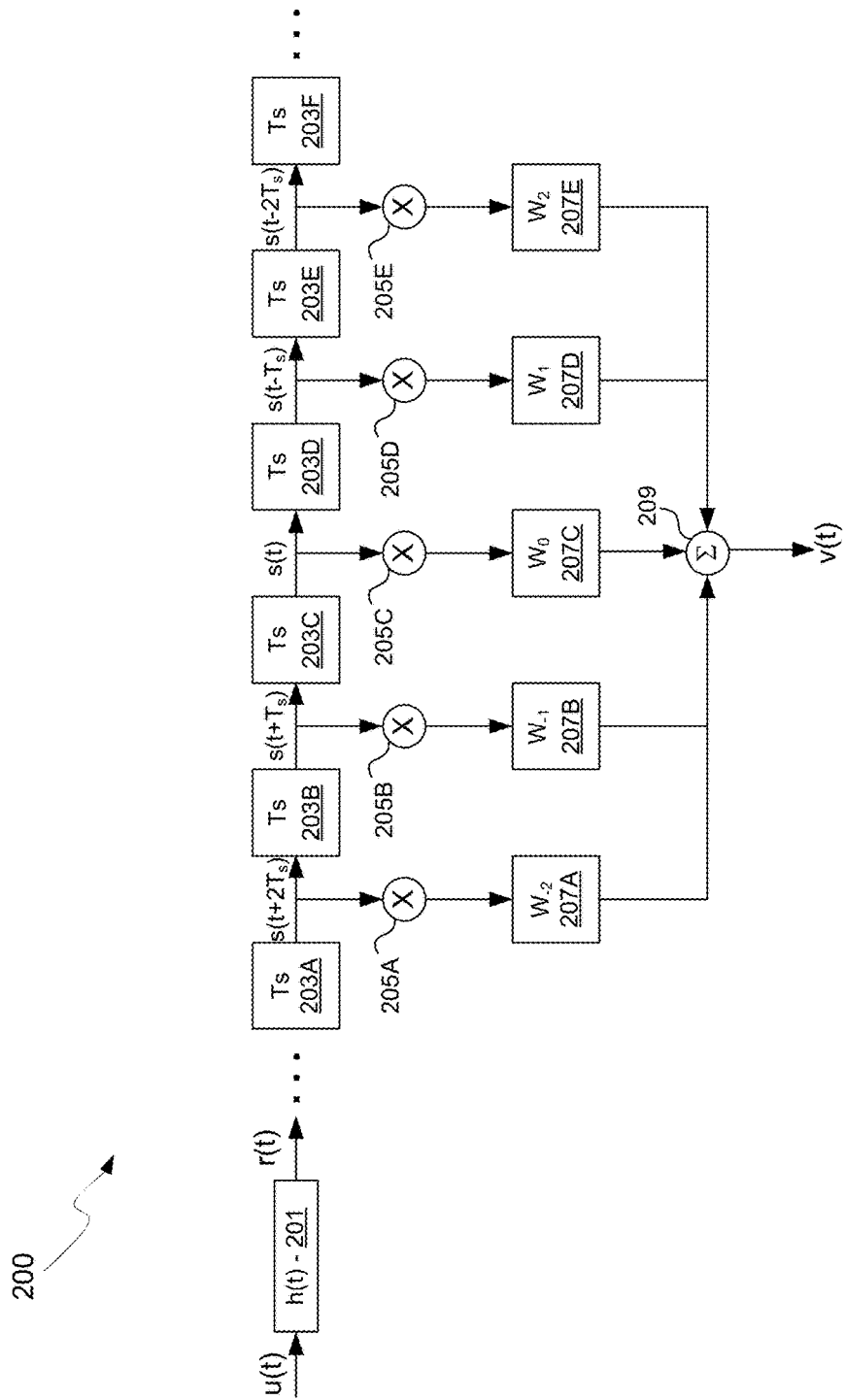
FIG. 2 illustrates an equalizer that operates in the electrical domain, in accordance with an example embodiment of the disclosure.

FIG. 2 illustrates an equalizer that operates in the electrical domain, in accordance with an example embodiment of the disclosure. Referring to FIG. 2, there is shown an equalizer 200 receiving an input signal u(t), which represents an original clean signal u(t) that is subject to the transfer function h(t) of a channel, either Tx or Rx, resulting in a signal with inter-symbol interference (ISI), which may occur in optical communication systems, and may limit the maximum speed of the communication system.

The equalizer 200 comprises a plurality of delay elements 203A-203F, multipliers 205A-205E, weight functions 207A-207E, and a summer 209. The equalizer 200 may generate a delayed version of the original signal r(t) with unintentional ISI utilizing delay elements 203A-203F, resulting in delayed signals s(t). The delayed signals s(t) may each be weighted independently using the multipliers 205A-205E and weight functions 207A-207E, and then summed using the summer 209 generating an output signal v(t). Theoretically, this structure may remove all ISI in a communication system, although in practical situations, non-idealities may be encountered. These may include noise added to the system, non-linearity of elements, variation in delay elements to the ideal symbol period Ts, the weight $W_N$ may not be controllable or accurate, or the summation may not be accurate.

Figure 3:
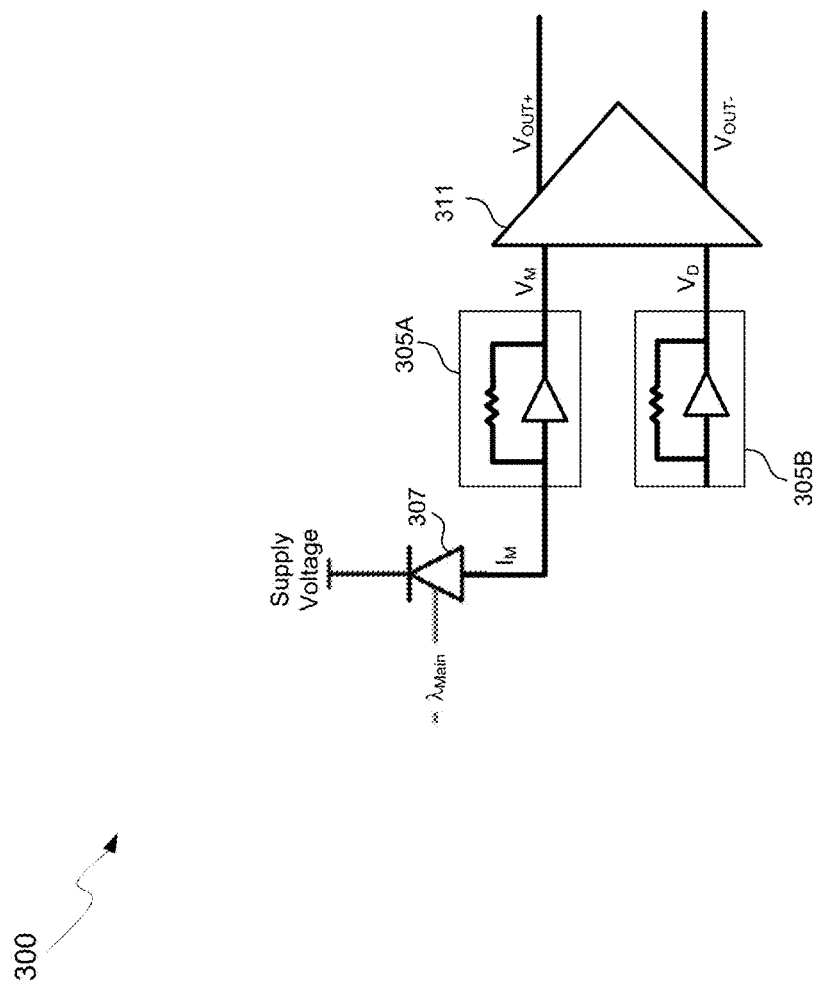
FIG. 3 illustrates a transimpedance amplifier circuit, in accordance with an example embodiment of the disclosure.

FIG. 3 illustrates a transimpedance amplifier circuit, in accordance with an example embodiment of the disclosure. Referring to FIG. 3, there is shown TIA circuit 300 comprising a photodetector 307, main TIA 305A, dummy TIA 305B, and an output gain stage 311. The main TIA 305A may be configured for receiving an input signal, the current $I_M$ from the photodetector 307, and generating an output voltage $V_M$ at a first input, e.g., the positive input, of the gain stage 311. The dummy TIA 305B may be configured for generating a reference voltage $V_D$ at a second input, e.g., the negative input, of the gain stage 311. The gain stage 311 may comprise a voltage amplifier, for example.

The TIA's 305A and 305B are illustrated as gain stages with a simple resistive feedback impedance, although the disclosure is not so limited, as the feedback paths may comprise additional gain stages coupled to parallel replica TIAs or other active impedance devices, for example. The gain of the TIAs 305A and 305B may be configured by adjusting a feedback impedance or the gain stage of the TIAs.

The photodetector 307 may be coupled to a bias supply voltage and to the main TIA 305A, and may be operable to receive an optical signal and generate an output current $I_M$. The outputs of the main TIA 305A and the dummy TIA 305B may be coupled to gain stage 311, with the output of the dummy TIA 305B providing a reference against which the gain stage 311 may generate a differential voltage at its outputs. In this manner, a differential input signal may be generated at the output of the gain stage 311 from the single-ended signal generated by the photodetector.

In operation, an optical signal, $\lambda_{main}$, may be received by the photodetector 307, which may be reverse-biased by the supply voltage, generating an output current $I_M$ that is coupled to the main TIA 305A. The main TIA 305 receives the input current $I_M$ and generates an output voltage $V_M$ that is coupled to an input of the gain stage 311.

Figure 4:
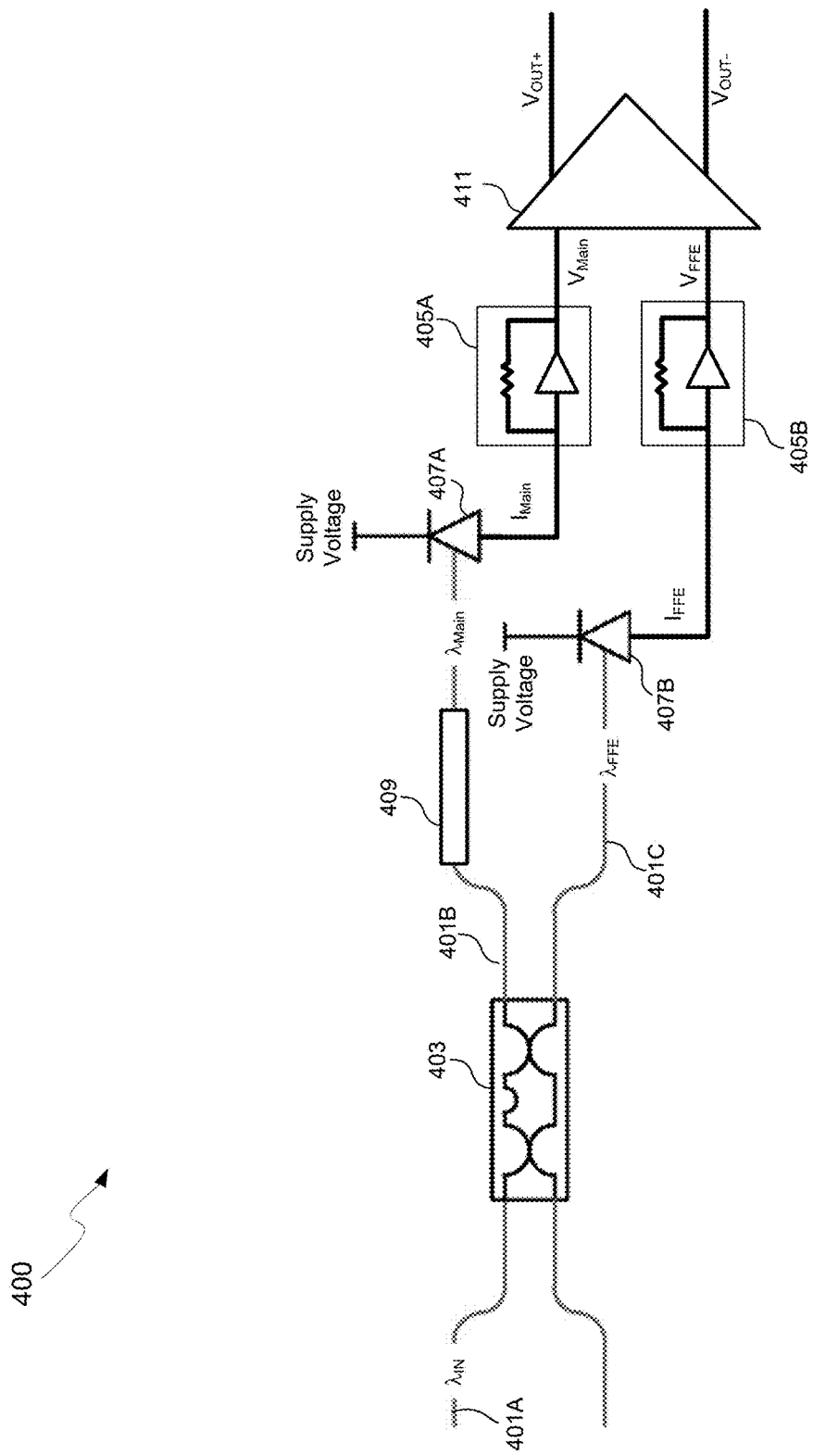
FIG. 4 illustrates a waveguide delay-based single-ended to differential circuit, in accordance with an example embodiment of the disclosure.

FIG. 4 illustrates a waveguide delay-based single-ended to differential circuit, in accordance with an example embodiment of the disclosure. Referring to FIG. 4, there is shown equalizer 400 comprising input waveguide 401A, main and FFE waveguides 401B and 401C, a directional coupler 403, a waveguide delay 409, a pair of photodetectors 407A and 407B, transimpedance amplifiers (TIAs) 405A and 405B, and gain stage 411.

The waveguide delay 409 may comprise an appropriate length waveguide for creating an accurate delay without significant optical power loss. In a typical silicon photonics system, the waveguide delay may comprise a 3 mm waveguide, for example, which may result in ~40 ps of delay, suitable for a 25G symbol per second signal. The TIAs 405A and 405B may each comprise a gain stage with a feedback impedance comprising a resistor and/or active elements, generating an output voltage proportional to the input current.

An input optical signal, $\lambda_{IN}$, may be communicated to the directional coupler 403 via input waveguide 401A, and portions of this input signal may be communicated to each of the output waveguides 401B and 401C via the directional coupler 403. Output waveguide 401B may be utilized to couple the directional coupler 403 to the waveguide delay 409 and subsequently to the photodetector 407A, while the other output waveguide 401C is coupled directly to photodetector 407B. The resulting electrical signal from photodetector 407B may be coupled to TIA 405B.

The electrical currents generated by the photodetectors 407A and 407B may be coupled to the TIAs 405A and 405B, which may generate output voltages proportional to the difference of received photocurrents $I_{FFE}$ and $\lambda_{MAIN}$. While the example shown in FIG. 4 shows the photodetectors with anode coupled to a supply voltage and cathode coupled to the TIAs, they may instead be configured with cathode coupled to ground and anode coupled to the TIAs.

The gain stage 411 may amplify the voltages generated by the TIAs 405A and 405B, thereby generating a differential output voltage proportional to the difference of the two optical signals, and thus the equalized version of the input optical signal $\lambda_{IN}$.

In an example scenario, the weight factors in the equalizing of the received signals may be implemented optically as opposed to electrically. However, electrical weighting of the optical signals $\lambda_{main}$ and $\lambda_{ffe}$ may be achieved by configuring the gain of the TIAs 405A and 405B, as this configuring of the gain thus determines the weight of the optical signal that generated the photo-generated current.

The directional coupler 403 splits the received optical signal into two optical signals with good precision, and cascading directional couplers may be utilized to create multiple optical signals. These optical paths may each be separately converted by a photodetector to an electrical current signal.

In the example equalizer 400 of FIG. 4, the summing, in this case summing with negative weight W, occurs after transimpedance amplification, i.e., the differential voltage amplification by the gain stage 411. The main signal path with optical signal $\lambda_{main}$ may be converted to a single voltage signal using TIA 405A. This voltage is used as a positive voltage coupled to a voltage amplifier, gain stage 411. Each weighted signal may be converted into current and then combined, in this example $\lambda_{FFE}$ being converted to a photo-generated current from the photodetector 407B. TIA 405B is then used to convert the received current into a voltage, which may be used as a negative voltage signal of a differential voltage amplifier, gain stage 411. Optionally, the gain of TIA 405B may be adjustable to further adjust gain. This voltage forms the negative voltage of a differential voltage signal at the output of gain stage 411.

Figure 5:
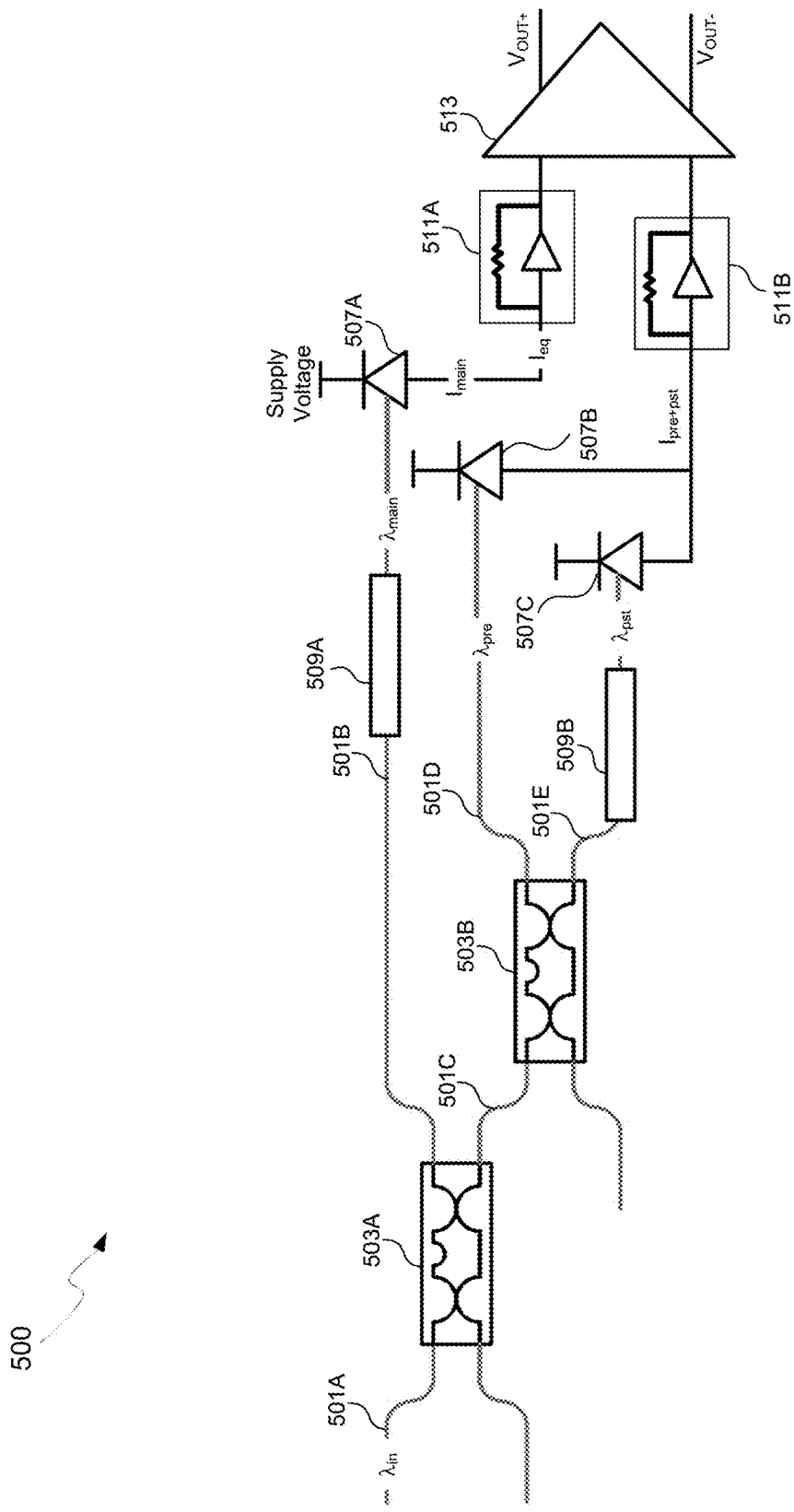
FIG. 5 illustrates another example of waveguide delay-based single-ended to differential circuit, in accordance with an example embodiment of the disclosure.

FIG. 5 illustrates another example of waveguide delay-based single-ended to differential circuit, in accordance with an example embodiment of the disclosure. Referring to FIG. 5, there is shown equalizer 500 comprising waveguides 501A-501E, two directional couplers 503A and 503B, two waveguide delays 509A and 509B, two photodiodes 507A-507C, delay lines 509A and 509B, TIAs 511A and 511B, and gain stage 513.

The directional couplers 503A and 503B, waveguides 501A-501E, photodiodes 507A-507C, TIAs 511A and 511 B, and gain stage 513 may share any and all aspects of the directional couplers, waveguides, photodiodes, TIAs, and gain stages described with respect to FIGS. 2-4, for example. While the example shown in FIG. 5 shows the photodetectors with anode coupled to a supply voltage and cathode coupled to the TIAs, they may instead be configured with cathode coupled to ground and anode coupled to the TIAs.

The waveguide delays 509A and 509B may each comprise an appropriate length waveguide for creating an accurate delay without significant optical power loss. In an example scenario, the 509B delay is greater than that of 509A to enable post-cursor equalization through the delay 509B path. The TIAs 511A and 511B may comprise a gain stage with a feedback impedance comprising a resistor and/or active elements, generating an output voltage proportional to the input current.

An input optical signal $\lambda_{in}$ may be received on input waveguide 501A and a portion of the signal may be coupled to each of the output waveguides 501B and 501C of the first directional coupler 503A, with one output waveguide 501B coupled to delay waveguide 509A and subsequently to photodiode 507A. The other output waveguide 501C may be coupled to second directional coupler 503B whose outputs may be coupled to the photodiode 507B via waveguide 501D and to second waveguide delay 509B via waveguide 501E, which is subsequently coupled to the photodiode 507C.

In the example shown in FIG. 5, the two photodiodes 507B and 507C generate output currents that are summed by coupling their output terminals, cathodes in this example. The summed current may then be converted to a voltage using the TIA 511B.

In the example equalizer 500 of FIG. 5, the summing, in this case summing with negative weight W, occurs after transimpedance amplification, i.e., the differential voltage amplification by the gain stage 513. The main signal path with optical signal $\lambda_{main}$ may be converted to a single voltage signal using TIA 511A. This voltage is used as a positive voltage coupled to a voltage amplifier, gain stage 513. Each weighted signal may be converted into current and then combined, in this example $\lambda_{pre}$ being converted to a photo-generated current from the photodetector 507B and $\lambda_{pst}$ being converted to a photo-generated current from the photodetector 507C. TIA 511B is then used to convert the received current into a voltage, which may be used as a negative voltage signal of differential voltage amplifier, gain stage 513. Optionally, the gain of TIA 511B may be adjustable to further adjust gain. This voltage forms the negative voltage of a differential voltage signal at the output of gain stage 513.

In another example scenario, the photodiodes 507B and 507C may be replaced with a multi-input photodetector that outputs a photogenerated current from two input optical signals, thereby providing optical summing in the equalizer 500.

In this example, a one-tap precursor equalization is demonstrated where the summation is by voltage summing at the output gain stage 513, and the weight control is via the directional couplers 503A and 503B and precursor TIA 511B gain. For example, the weighting may be configured by configuring the directional coupler 503A to have a small portion of the input optical signal $\lambda_{main}$ coupled to the output waveguide 501C and most of the input optical signal $\lambda_{main}$ coupled to output waveguide 501B. Advantages of this example are that the voltage summing is accomplished conveniently in single-ended to differential conversions with the single-ended TIA structure, the paths may be physically identical for the main and precursor tap which facilitates delay matching, it is compatible with optical summing, and weight can be adjusted with accurate TIA control.

In an example embodiment, a method and system are disclosed for waveguide delay based equalization summing at single-ended to differential converters in optical communication. In this regard, aspects of the disclosure may comprise an optoelectronic receiver comprising an optoelectronic receiver comprising a directional coupler, first and second photodetectors, first and second transimpedance amplifiers (TIAs), and a gain stage, the optoelectronic receiver being operable to: receive an input optical signal; split the input optical signal into first and second optical signals using the directional coupler; generate a first electrical current from the first optical signal using a first photodetector; generate a first voltage from the first electrical current using the first TIA; communicate the first voltage to a first input of the gain stage; generate a second electrical current from the second optical signal using the second photodetector; generate a second voltage from the first electrical signal using the second TIA; communicate the second voltage to a second input of the gain stage; and generate a differential output voltage from the first and second voltages using the gain stage.

The first optical signal may be delayed before generating the first electrical signal, which may be delayed using a waveguide delay. The first and second photodetectors may be photodiodes. The second optical signal may be split into third and fourth optical signals using a second directional coupler before generating the second electrical signal.

The delayed fourth optical signal may be coupled to a third photodetector and summing its output current with an output current from the second photodetector. The differential output voltage may be proportional to the input optical signal. The first optical signal may be weighted by configuring a gain of the first TIA and the second optical signal may be weighted by configuring a gain of the second TIA. The first and second optical signals may be weighted by configuring a coupling coefficient of the directional coupler. The optoelectronic receiver may be on a silicon complementary metal oxide semiconductor (CMOS) photonic die.

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
    in an optoelectronic receiver comprising a directional coupler, first and second photodetectors, first and second transimpedance amplifiers (TIAs), and a gain stage:
    receiving an input optical signal;
    splitting the input optical signal into first and second optical signals using the directional coupler;
    delaying the first optical signal received from the directional coupler using an optical delay at an output of the directional coupler;
    generating a first electrical current from the first optical signal using the first photodetector;
    generating a first voltage from the first electrical current using the first TIA;
    communicating the first voltage to a first input of the gain stage;
    generating a second electrical current from the second optical signal using the second photodetector;
    generating a second voltage from the first electrical signal using the second TIA;
    communicating the second voltage to a second input of the gain stage; and
    generating a differential output voltage from the first and second voltages using the gain stage.

2. The method according to claim 1, comprising delaying the first optical signal using a waveguide delay.

3. The method according to claim 2, wherein the waveguide delay is coupled to an output of the directional coupler.

4. The method according to claim 1, wherein the first and second photodetectors comprise photodiodes.

5. The method according to claim 1, comprising splitting the second optical signal into third and fourth optical signals using a second directional coupler before generating the second electrical signal.

6. The method according to claim 5, comprising coupling the delayed fourth optical signal to a third photodetector and summing its output current with an output current from the second photodetector.

7. The method according to claim 1, comprising weighting the second optical signal by configuring a gain of the second TIA.

8. The method according to claim 1, comprising weighting the second optical signal by configuring a gain of the second TIA.

9. The method according to claim 1, comprising weighting the first and second optical signals by configuring a coupling coefficient of the directional coupler.

10. The method according to claim 1, wherein the optoelectronic receiver is on a silicon complementary-metal oxide semiconductor (CMOS) photonics die.

11. A system for communication, the system comprising:
an optoelectronic receiver comprising a directional coupler, first and second photodetectors, first and second transimpedance amplifiers (TIAs), and a gain stage, the optoelectronic receiver being operable to:
receive an input optical signal;
split the input optical signal into first and second optical signals using the directional coupler;
delay the first optical signal received from the directional coupler using an optical delay at an output of the directional coupler;
generate a first electrical current from the first optical signal using the first photodetector;
generate a first voltage from the first electrical current using the first TIA;
communicate the first voltage to a first input of the gain stage;
generate a second electrical current from the second optical signal using the second photodetector;
generate a second voltage from the first electrical signal using the second TIA;
communicate the second voltage to a second input of the gain stage; and
generate a differential output voltage from the first and second voltages using the gain stage.

12. The system according to claim 11, wherein the optoelectronic receiver is operable to delay the first optical signal using a waveguide delay.

13. The system according to claim 12, wherein the waveguide delay is coupled to an output of the directional coupler.

14. The system according to claim 11, wherein the first and second photodetectors comprise photodiodes.

15. The system according to claim 11, wherein the optoelectronic receiver is operable to split the second optical signal into third and fourth optical signals using a second directional coupler before generating the second electrical signal.

16. The system according to claim 15, wherein the optoelectronic receiver is operable to couple the delayed fourth optical signal to a third photodetector and summing its output current with an output current from the second photodetector.

17. The system according to claim 11, wherein the optoelectronic receiver is operable to weight the first optical signal by configuring a gain of the first TIA.

18. The system according to claim 11, wherein the optoelectronic receiver is operable to weight the second optical signal by configuring a gain of the second TIA.

19. The system according to claim 11, wherein the optoelectronic receiver is operable to weight the first and second optical signals by configuring a coupling coefficient of the directional coupler.

20. A system for communication, the system comprising:
an optoelectronic receiver in a complementary metal-oxide semiconductor (CMOS) die, said optoelectronic receiver comprising a directional coupler, first and second photodetectors, first and second transimpedance amplifiers (TIAs), and a gain stage, the optoelectronic receiver being operable to:
receive an input optical signal;
split the input optical signal into first and second optical signals using the directional coupler;
delay the first optical signal using an optical delay at an output of the directional coupler;
generate a first electrical current from the delayed first optical signal using the first photodetector;
generate a first voltage from the first electrical current using the first TIA;
communicate the first voltage to a first input of the gain stage;
generate a second electrical current from the second optical signal using the second photodetector;
generate a second voltage from the first electrical signal using the second TIA;
communicate the second voltage to a second input of the gain stage; and
generate a differential output voltage from the first and second voltages using the gain stage.

* * * * *